UNITED STATES PATENT OFFICE.

WILLIAM D. CRAVEN, OF JERSEY CITY, NEW JERSEY.

IMPROVEMENT IN PREPARING BLOOD FOR FERTILIZERS.

Specification forming part of Letters Patent No. 136,036, dated February 18, 1873.

*To all whom it may concern:*

Be it known that I, WILLIAM D. CRAVEN, of Bergen District, Jersey City, in the county of Hudson and State of New Jersey, have invented a new and useful Improvement in the Preparation of Blood for Fertilizers and other purposes, of which the following is a specification:

My invention relates to the treating of blood to render it commercial; and my said invention therein consists in treating blood in a vessel by the direct application of heat without the direct contact therewith of steam or boiling in water, such treatment being effected by forcing or spraying or flowing the blood upon the heated walls of a chamber, whereby immediate dehydration is produced, and the blood reduced to an article of commerce; the object and advantage of which method of treatment saves the necessity of drainage from the vessel, and subsequent pressure of the material.

In the process heretofore practiced in treating blood, steam has been introduced into the vessel for the purpose of coagulation, as a first step toward drying. This process, it will be seen, necessitates the condensation of the steam within the mass, adding thereby to its bulk and moisture, and it is rendered necessary to drain or press it previous to evaporation or drying. Much of the virtue of the blood is lost by this leaching or draining, whereas my process is simply evaporating the water of the blood, and at the same time preserving all the nitrogenous properties thereof.

It has also been recommended and apparatus provided for the drainage of the serum of the blood, and thus loose it. As this element is nitrogenous, I am able by my process to preserve it, and thereby obtain from the blood all its nitrogenous qualities, for if it is treated while fresh, or before fermentation, its properties are non-volatile; consequently, no loss takes place by simple vaporization.

Any suitable vessel may be employed for carrying out my new process, the same being heated by steam within a surrounding chamber, or the direct application of heat to the walls of the vessel. This vessel may be provided with agitators, or may be itself rotary. Where the process is carried on without agitators it will be necessary to grind or pulverize the product.

The blood may be introduced into the vessel in any suitable way, whether by force or otherwise. I prefer that it be forced by injection, through a small orifice or orifices to insure a thorough separation and disintegration of clots, and in this way bring the particles of serum, fluid, or several constituents of the blood in contact with the heated walls of the chamber or vessel. This method of treatment also renders the operation comparatively very quick.

The product may be removed from the vessel in any suitable way; and by injecting or flowing it upon heated plates it is thereby made a new article of commerce, as a fertilizer, having lost none of its essential qualities in or during the process of dehydration.

Having thus described my invention, I claim—

1. The process, substantially as herein described, for treating blood for a fertilizing agent, or other purposes, by the injection or introducing it directly upon the heated walls of a vessel or chamber.

2. The within-described method of treating blood by the employment of force or pressure to inject it into a heated vessel or chamber or upon heated walls.

3. As a new article of manufacture, blood treated and prepared for fertilizing or other purposes, substantially as set forth.

In testimony whereof I have hereunto set my hand in the presence of two witnesses.

WM. D. CRAVEN.

Witnesses:
CHARLES C. EWAN,
W. MUIRHEID.